(12) United States Patent
Bachelard et al.

(10) Patent No.: US 8,393,326 B2
(45) Date of Patent: Mar. 12, 2013

(54) DEVICE FOR OXYGEN SUPPLY OF A USER IN AN AIRCRAFT

(75) Inventors: Leopoldine Bachelard, Chatillon (FR); Sebastien Bruckert, Plaisir (FR)

(73) Assignee: Intertechnique (FR)

( * ) Notice: Subject to any disclaimer, the term of this patent is extended or adjusted under 35 U.S.C. 154(b) by 260 days.

(21) Appl. No.: 12/811,535

(22) PCT Filed: Jan. 4, 2008

(86) PCT No.: PCT/IB2008/051263
§ 371 (c)(1),
(2), (4) Date: Jul. 2, 2010

(87) PCT Pub. No.: WO2009/087488
PCT Pub. Date: Jul. 16, 2009

(65) Prior Publication Data
US 2010/0288880 A1    Nov. 18, 2010

(51) Int. Cl.
*A62B 18/08*    (2006.01)
*A62B 9/04*     (2006.01)
*B64D 11/00*    (2006.01)
*B64D 13/00*    (2006.01)

(52) U.S. Cl. ............ 128/206.27; 128/202.27; 244/118.5

(58) Field of Classification Search ............ 128/200.24, 128/201.22–201.29, 202.11, 202.27, 204.18, 128/204.29, 205.25, 206.21, 206.27, 206.28, 128/207.11, 912; 244/118.5; 403/290, 321, 403/322.3; 24/630–634, 637; 292/3, 10, 292/17, 19, 20, 32, 33, 38, 80, 84, 91, DIG. 11, 292/DIG. 16, DIG. 38

See application file for complete search history.

(56) References Cited

U.S. PATENT DOCUMENTS

| | | | |
|---|---|---|---|
| 3,056,402 A * | 10/1962 | Dickinson | 128/206.27 |
| 4,154,237 A | 5/1979 | Courter | |
| 5,078,343 A | 1/1992 | Howlett | |
| 6,089,230 A * | 7/2000 | Barker et al. | 128/204.29 |
| 6,789,539 B2 | 9/2004 | Martinez | |
| 2004/0144384 A1 | 7/2004 | Martinez | |
| 2005/0263156 A1 | 12/2005 | Westphal et al. | |

FOREIGN PATENT DOCUMENTS

WO   WO2006088581   8/2006

OTHER PUBLICATIONS

International Search Report and Written Opinion in International Application No. PCT/IB2008/051263.

* cited by examiner

*Primary Examiner* — Jackie Ho
*Assistant Examiner* — Mark K Han
(74) *Attorney, Agent, or Firm* — Dean W. Russell; Kristin M. Crall; Kilpatrick Townsend & Stockton LLP

(57) ABSTRACT

A device for oxygen supply of a user in an aircraft comprising a breathing mask (20), a stowage box (1) for the breathing mask and an oxygen supply hose (22) having one end connected to the stowage box and the other end connected to the breathing mask, wherein the device further comprises means (3) to fix the stowage box in a ceiling of the aircraft, an aperture on the bottom side of the stowage box closed by a door (7) and a leash (28) connected to the stowage box by one end and to the breathing mask by the other end so that, when the door is open, the mask falls and is kept hovered by the oxygen supply hose and the leash.

13 Claims, 2 Drawing Sheets

DEVICE FOR OXYGEN SUPPLY OF A USER IN AN AIRCRAFT

CROSS REFERENCE TO RELATED APPLICATION

This application is the U.S. national phase of International Application No. PCT/IB2008/051263 filed on Jan. 4, 2008, and published in English as International Publication No. WO2009/087488 A1 on Jul. 16, 2009, the entire contents of which are incorporated herein by reference.

FIELD OF THE INVENTION

The invention relates to the field of device for oxygen supply of a user in an aircraft comprising a breathing mask, a stowage box for the breathing mask and an oxygen supply hose having one end connected to the stowage box and the other end connected to the breathing mask. The invention relates also to a method to use the same.

BACKGROUND OF THE INVENTION

To ensure the safety of the passengers and crewmembers in case of a depressurization accident or the occurrence of smoke in the aircraft, aviation regulations require on board all airliners a safety oxygen supply circuit able to supply each passenger and crewmember with an oxygen flow rate function of the cabin altitude. Such oxygen is delivered to the crewmember or passenger, also known as end user, through a breathing mask.

After a depressurization accident or upon the occurrence of smoke in the aircraft, the users must don their protective mask upon their face as quickly as possible. Indeed, the lack of oxygen at high altitude (hypoxia) or the toxic fumes can alter the users' abilities to proceed with any emergency measures.

For crewmember, the breathing mask comprises an on-demand regulator which is able to regulate the gas inside the breathing mask in term of oxygen content and pressure. This type of regulator is well known in the art and is disclosed, for instance, in document U.S. Pat. No. 6,789,539 which is incorporated herein by reference.

The protective mask is generally stored in a box called a stowage box located next to the crewmember's position. Generally, the stowage box comprises a frame forming a receptacle for the mask, itself having an open face of rectangular shape for inserting and extracting the mask, and at least one door closing the open face of the frame, at least in part. The box is installed on the right or left of the seat of the pilot, the open face being generally the top side of the box. The stowage box comprises a pneumatic assembly able to close the feed of breathing gas of the breathing mask when the breathing mask is installed in the stowage box. The objective of the pneumatic assembly is to reduce or suppress the consumption of breathing gas when the mask is not in use. Therefore, the pneumatic assembly is connected to one of the doors of the box such that the feed of breathing gas is closed when the doors are closed and is open when the doors are open.

For instance, patent application US 2004/0144384, which is incorporated herein by reference, discloses such a box.

The box is generally disposed around the seat of the crewmember. However, a problem with such a box is that it occupied a space which is precious as a lot of equipments need to be arranged around the crewmember.

For passenger, the breathing mask is much simpler and comprises generally a simple plastic cup with straps. The plastic cup is connected through a plastic hose to an oxygen source. The breathing mask is stowed in a box disposed in the ceiling, above the passenger. In case of emergency, a crewmember, through some automatic means, opens the box and the plastic cup falls in front of the passenger's face, just maintained by the plastic hose, but which is enough due to the weightlessness of the cup. The passenger takes the cup, put it on its face and adjusts the straps around his/her head to maintain it.

However, this type of breathing mask is not satisfactory in place where the stowage box cannot be installed in the ceiling above the user. For instance, in some aircraft toilet, the stowage box position is far away from the user. Thus, the supply hose length is such that the mask falls down on the floor which is neither practical nor hygienic.

Furthermore, when passengers are professionals, who work in the aircraft like postmen in a cargo aircraft, or very important persons travelling in a private aircraft, there is a demand to install on-demand breathing masks for these passengers. However, due to the weight of such a mask, often many hundred grams or so, it is not possible to let it fall from a ceiling box as the plastic cup and therefore, installation of on-demand breathing masks for passengers is limited nowadays to the capability to change the cabin layout to install the same boxes than those used for crewmembers.

SUMMARY OF THE INVENTION

It would be advantageous to achieve a stowage box and an on-demand breathing mask that can be installed in the ceiling of a cabin but without the limitations of nowadays passenger breathing mask in terms of stowage box position and/or breathing mask weight.

To better address one or more concerns, in a first aspect of the invention, a device for oxygen supply of a user in an aircraft comprises a breathing mask, a stowage box for the breathing mask and an oxygen supply hose having one end connected to the stowage box and the other end connected to the breathing mask. The device further comprises means to fix the stowage box in a ceiling of the aircraft, an aperture on the bottom side of the stowage box closed by a door and a leash connected to the stowage box by one end and to the breathing mask by the other end so that, when the door is open, the mask falls and is kept hovered by the oxygen supply hose and the leash.

The leash and the hose advantageously control the fall of the breathing mask so that it arrives in a defined space in front of the user's face. Therefore, it is possible to install breathing mask for passenger and it is also possible, for some aircraft, to install the stowage box in the ceiling of the cabin for the breathing mask of crewmember. In case of lightweight passenger breathing mask, the leash advantageously maintains it in a position where it can be efficiently grabbed by the user.

In particular embodiments:
the leash is connected to the breathing mask by means of a release pin;
the breathing mask comprises two substantially parallel plates, each plate having a hole, and said release pin having two ends able to enter into said plate holes and a shape to allow an elastic movement of distance of the two ends such that the two ends are maintained in the plate holes by the elasticity of the release pin;
the two ends are bent in sharp angle so that the force generated by the fall of the breathing mask does not extract the ends from the plate holes;
the release pin further comprises a first hole near one end and a second hole near the other end and wherein a string is attached to the first hole and pass through the second hole so that, when the string is pulled, the two ends come nearer and move out of the plate holes to release the breathing mask;

the oxygen supply hose and the leash are attached to two opposite sides of the stowage box.

Depending on the type of device, a particular embodiment may be preferred as easier to adapt. Aspects of these particular embodiments may be combined or modified as appropriate or desired, however.

BRIEF DESCRIPTION OF THE DRAWINGS

These and other aspects of the invention will be apparent from and elucidated with reference to the embodiment described hereafter where.

DESCRIPTION OF EMBODIMENTS OF THE INVENTION

Figure 1:
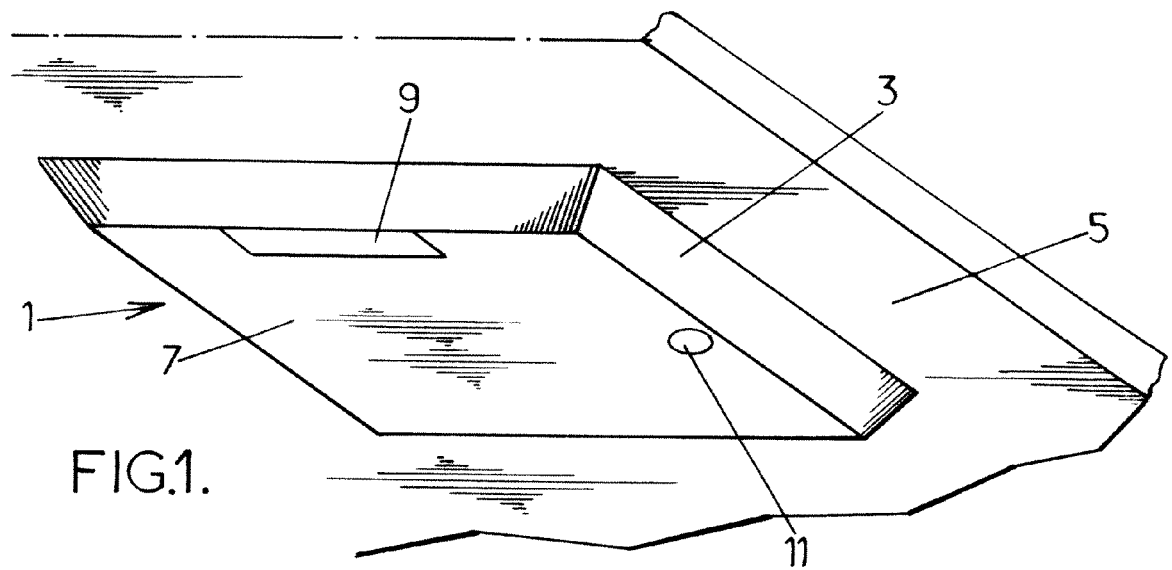
FIG. 1 is an isometric view of a closed stowage box installed in the ceiling of a cabin in accordance with an embodiment of the invention.

In reference to FIG. 1, a stowage box 1 for breathable mask (not represented) comprises a frame 3 to attach the box to the ceiling 5 of an aircraft cabin. A door 7 comprises a "press-to-test" button 9 and a blinker 11.

The "press-to-test" button 9 is used to test the oxygen supply mechanism of the box with the mask staying in the box and the blinker 11 is a visual signal to determine if the oxygen flows to the mask. The "press-to-test" button 9 and the blinker 11 will not be described further as they are well known of the man skilled in the art and disclose, for instance, in the here above referenced documents.

Figure 2:
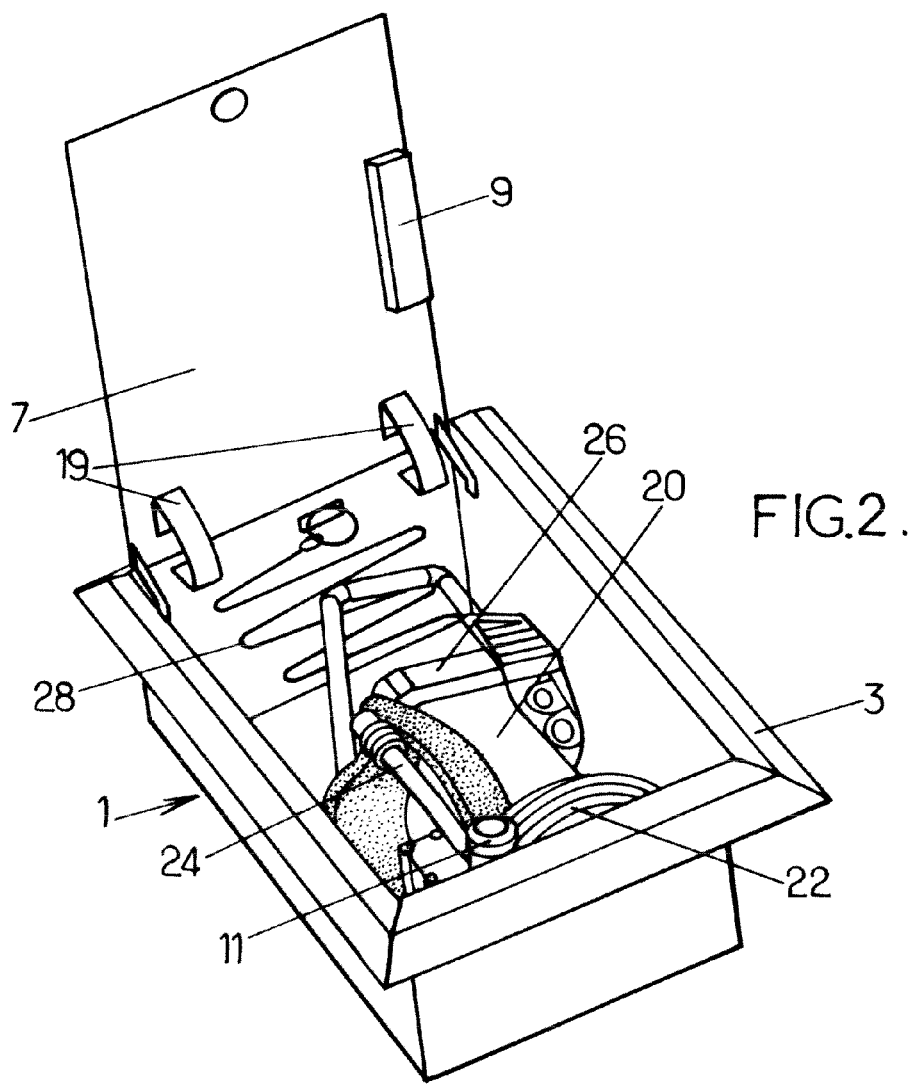
FIG. 2 is an isometric view of the stowage box according to FIG. 1 in an open position.

The door 7 is rotating around one side of the stowage box by means of supple hinges 19, FIG. 2.

The stowage box 1 contains a breathing mask 20 connected to an oxygen supply hose 22. The oxygen supply hose has one end connected to the stowage box 1 at the arrival of an oxygen source (not represented) and a second end 24 connected to the on-demand regulator 26 of the breathing mask 20 and is stored as a folded up helix. A leash 28 links the stowage box 1 and the breathing mask 20. The leash is connected to the stowage box on the opposite side of the oxygen supply hose 22.

Figure 3:
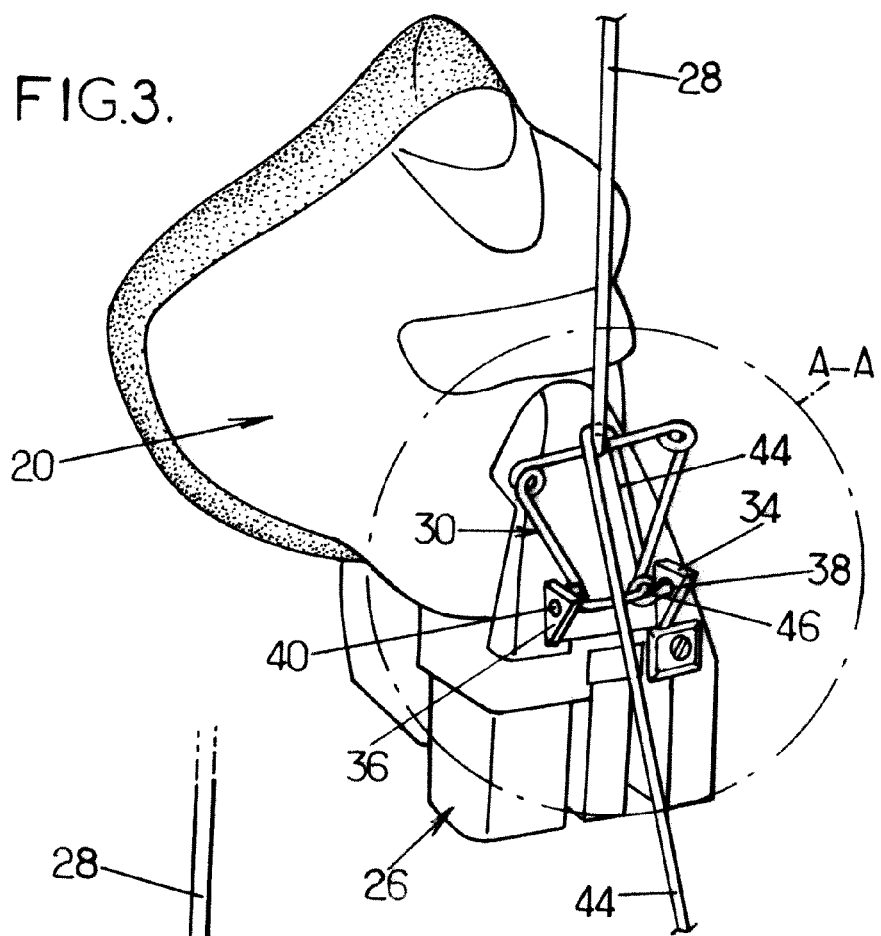
FIG. 3 is an isometric view of a breathing mask stowed in the stowage box of FIG. 1.
Figure 4:
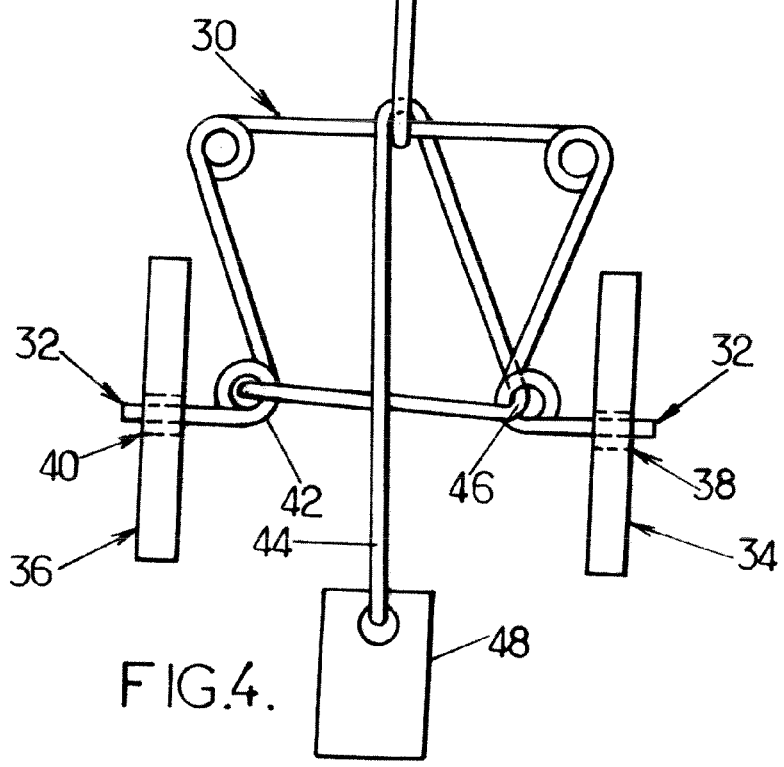
FIG. 4 is a front view of the part AA of the breathing mask of FIG. 3.

The leash 28 is connected, FIGS. 3 and 4, to the breathing mask 20 by means of a release pin 30.

The release pin 30 has a substantially U-shape, or trapezoidal shape, with the two ends 32 of the pin bent outwardly to form a sharp angle. The shape of the release pin 30 is chosen to create the capability of an elastic movement of proximity of the two ends 32.

The leash 28 is attached to the bottom of the U of the release pin 30.

The breathing mask 20 comprises two substantially parallel plates 34, 36 disposed symmetrically from the axial plan of the mask and near the external end of the mask. Each plate 34, 36 comprises a hole 38, 40 in which one pin end 32 is inserted.

The release pin 30 further comprises a hole 42 formed near one end 32 on which is attached a string 44. The string 44 passes through a second hole 46 formed near the other end 32 and is terminated by a cloth band 48 which may be used as grasping means.

The use of the stowage box 1 and its breathing mask 20 is the following.

The door is kept in the closed position by a latch. A pneumatic piston (not represented) is also fixed to the box shell and is set perpendicular to the door 7. When the piston is supplied with pressure from an actuation inlet (either by automatic actuation following a decompression or by pilot manual action), it exerts a force on a lever to release the latch and therefore the door and the mask falls down by gravity.

As the door opens, an on/off valve controlling oxygen supply opens, supplying the mask 20 with oxygen.

The mask fall is stopped by the leash 28 and partially by the oxygen supply hose 22 as its helical shape softens the fall. As the leash 28 is attached to the bottom of the U of the release pin 30 and the ends 32 are bent to form a sharp angle, the force generated by the fall at the level of the ends 32 and holes 38, 40 cannot extract the ends 32 from the holes 38, 40 and thus cannot release the breathing mask.

The user grabs the mask with one hand and use the other hand to pull on the string 44 by means of the cloth band 48. By pulling on the string 44, both ends 32 of the release pin 30 come nearer and, thus, go out of the holes 38, 40, freeing the mask from the leash. Then the user dons the breathing mask as usual.

The blinker 11 turns yellow indicating that the supply valve is opened and that oxygen is supplied to the mask.

While the invention has been illustrated and described in details in the drawings and foregoing description, such illustration and description are to be considered illustrative or exemplary and not restrictive; the invention is not limited to the disclosed embodiment.

Particularly, the man skilled in the art understands that the described embodiment may be used with a nowadays passenger breathing mask when the stowage box cannot be installed in a ceiling place near the passenger head. In this case, the leash length and attachment is calculated to position the fallen down mask in a space where the passenger can easily grab it, then detach the leash and put it on his/her face.

For instance, different forms like, for instance, a V-shape, may be chosen for the release pin 30 with the constraint that the force generated by the fall on the leash 28 and the release pin 30 does not release the pin from the breathing mask.

Other variations to the disclosed embodiments can be understood and effected by those skilled on the art in practicing the claimed invention, from a study of the drawings, the disclosure and the appended claims. In the claims, the word "comprising" does not exclude other elements and the indefinite article "a" or "an" does not exclude a plurality.

The invention claimed is:

1. Device for oxygen supply of a user in an aircraft comprising
    a breathing mask,
    a stowage box for the breathing mask having a bottom side and being adapted to be fixed in a ceiling of the aircraft,
    an oxygen supply hose having one end connected to the stowage box and one end connected to the breathing mask,
    an aperture on the bottom side of the stowage box closed by a door, and
    a leash having a first end connected to the stowage box and a second end releasably connected to the breathing mask so that, when the door is open, the mask falls and is kept hovered by the oxygen supply house with the leash,
    wherein the breathing mask comprises two holes, the device further comprises a release pin device connecting the leash to the breathing mask, said release pin device having a first pin end and a second pin end able to enter into said holes, the first pin end and the second pin end are movable between a rest position in the holes and a release position out of the holes, and the first pin end and the second pin end are elastically urged in the rest position.

2. The device according to claim 1, wherein the breathing mask comprises two substantially parallel plates, each plate having one of said two holes.

3. The device according to claim 2, wherein each of the first pin end and the second pin end is bent in a sharp angle so that the force generated by the fall of the breathing mask does not extract the first pin end and the second pin end from the holes.

4. The device according to claim 3, wherein the release pin device further comprises a string attached near the first pin end and a pass-through through which the string slides near the second pin end so that, when the string is pulled, the first pin end and the second pin end come nearer and move out of the holes to release the breathing mask.

5. The device according to claim 2, wherein the release pin device further comprises a string attached near the first pin end and a pass-through through which the string slides near the second pin end so that, when the string is pulled, the first pin end and the second pin end come nearer and move out of the holes to release the breathing mask.

6. The device according to claim 1, wherein the oxygen supply hose and the leash are attached to two opposite sides of the stowage box.

7. The device according to claim 1, wherein the oxygen supply hose has a helical shape to soften the fall of the breathing mask.

8. The device according to claim 1, wherein the release pin device further comprises a string attached near the first pin end and a pass-through through which the string slides near the second pin end so that, when the string is pulled, the first pin end and the second pin end come nearer and move out of the holes to release the breathing mask.

9. Device for oxygen supply of a user in an aircraft comprising a breathing mask and a stowage box for the breathing mask, said stowage box being fixed in a ceiling of the aircraft and having a bottom side, the device further comprising an oxygen supply hose having one end connected to the stowage box and one other end connected to the breathing mask, an aperture on the bottom side of the stowage box closed by a door and a leash connected to the stowage box by one end and releasably connected to the breathing mask by one other end so that, when the door is open, the mask falls and is kept hovered by the oxygen supply hose and the leash, wherein the breathing mask comprises two substantially parallel plates, each plate having a plate hole, and the device further comprises a release pin connecting the leash to the breathing mask and said release pin having two ends able to enter into said plate holes and a shape to releasably maintain the two ends in the plate holes by the elasticity of the release pin and allow a resilient movement to modify the distance between the two ends.

10. The device according to claim 9, wherein the release pin comprises one end, one other end, and a pass-through near the one other end, the device further comprises a string, the string is attached to the release pin near said one end of the release pin and slides through the pass-through so that, when the string is pulled, the two ends come nearer and move out of the plate holes to release the breathing mask.

11. Device for oxygen supply of a user in an aircraft comprising:

a breathing mask, a stowage box for the breathing mask having a bottom side and being adapted to be fixed in a ceiling of the aircraft, the stowage box having an aperture on the bottom side of the stowage box and a door to close said aperture, an oxygen supply hose having one end connected to the stowage box and one other end connected to the breathing mask, a leash having a first end connected to the stowage box and a second end releasably connected to the breathing mask so that, when the door is open, the mask falls and is kept hovered by the oxygen supply hose and the leash, a release device connecting the leash to the breathing mask, wherein said release device has a first end, a second end, and a pass-through near the second end, and a string connected to the release device and releasing the breathing mask from the leash when the string is pulled, wherein the string is attached near the first end and slides through the pass-through so that, when the string is pulled, the first end and the second end come nearer.

12. The device according to claim 11, wherein the release device is movable between a rest position and a release position, the release device is elastically urged in the rest position and the string moves the release device in the release position when the string is pulled.

13. The device according to claim 11, wherein:

the breathing mask comprises two holes, and the first end and the second end are removably positioned in said holes.

* * * * *